Dec. 20, 1966 D. L. HOWARD ET AL 3,293,559
VARIABLE FREQUENCY SIGNAL APPARATUS HAVING A STABILIZING REFERENCE SIGNAL
Original Filed Nov. 13, 1963
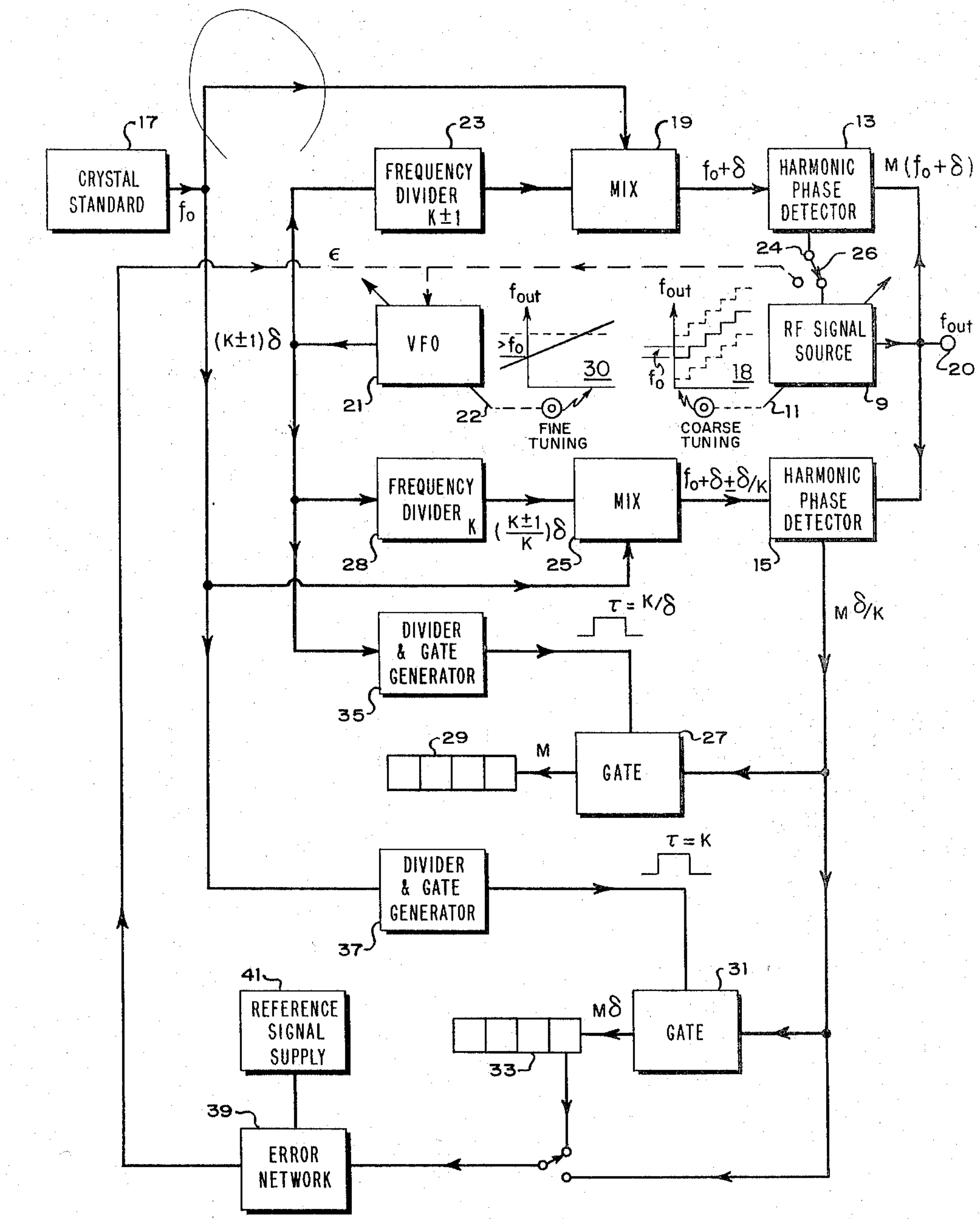
INVENTORS
DARWIN L. HOWARD
GIACOMO VARGIU
BY A. C. Smith
AGENT

United States Patent Office 3,293,559
Patented Dec. 20, 1966

3,293,559
VARIABLE FREQUENCY SIGNAL APPARATUS HAVING A STABILIZING REFERENCE SIGNAL

Darwin L. Howard, Colorado Springs, Colo., and Giacomo Vargiu, Redwood City, Calif., assignors to Hewlett-Packard Company, Palo Alto, Calif., a corporation of California Continuation of application Ser. No. 323,320, Nov. 13, 1963. This application Mar. 18, 1966, Ser. No. 541,897
7 Claims. (Cl. 331—2)

This is a continuation application of pending application Serial Number 323,320 entitled Variable Frequency Signal Apparatus, filed on November 13, 1963 by Darwin L. Howard and Giacomo Vargiu, now abandoned.

This invention relates to signal generators and more particularly to an improved signal source which remains phase locked to a reference frequency as the frequency of the output signal is varied over a wide range.

Certain signalling applications require the use of signal sources having a high degree of frequency stability. This is conventionally achieved in fixed frequency applications by locking the output signal of a signal source to a frequency standard. In applications where the frequency of this output signal must be varied over a wide range, a high degree of frequency stability may be achieved by locking the output signal to successive harmonics of a lower frequency standard.

In many of these applications it is also necessary to provide a direct indication of the frequency of the output signal. Of course, highly accurate indications of the frequency of the output signal may be obtained by counting its frequency directly. However where the frequency of the ouput signal is of the order of several kilomegacycles, direct counting would be extremely difficult in the present state of the art. Also, where the frequency is low and several places of precision are required, the gate time becomes very long. Instead of direct counting, a beat frequency is produced between a local oscillator and the high frequency signal to be measured, which beat frequency is measured using low frequency counting techniques. However, schemes of this type require that the number of the harmonic upon which the beat frequency is established be identified. It becomes extremely difficut to identify one harmonic number from an adjacent one where the harmonic numbers are of very high order. In these applications it is desirable to provide a counting scheme which provides a direct indication of the harmonic number and an indication of the variation between successive harmonic numbers.

Accordingly, it is an object of the present invention to provide a signal source which can be phase locked to a harmonic of a reference signal over a wide band of frequency variations.

It is another object of the present invention to provide an indicator circuit which provides an accurate indication of the output frequency of the signal source.

It is still another object of the present invention to provide improved signal apparatus which can be operated as a source of output signal and as a frequency meter for an applied signal.

In accordance with the illustrated embodiment of the present invention, a conventional harmonic phase detector which is responsive to the variation in phase between an applied high frequency signal and a harmonic of a reference signal is connected in a feedback circuit to maintain the high frequency signal in phase lock with a harmonic of the reference signal. This same reference signal is combined with a low frequency signal to form a resultant signal which is then compared with the high frequency signal in a second harmonic phase detector of similar conventional design. The output of this second harmonic phase detector contains information about the harmonic number to which the reference signal is phase locked and information about the low frequency signal which varies over the range of frequencies between successive harmonics of the reference signal. A low frequency counter operating for a gate time which is related to the low frequency signal counts the signal at the output of the second phase detector and displays the harmonic number directly. A second counter operating for a gate time which is related to a fixed frequency signal counts the signal at the output of the second phase detector and displays the low frequency variation which occurs between successive harmonic numbers. The combined readings, altered by suitable scale factors, thus provides a direct indication of the frequency of the high frequency signal. The usual ±1 count ambiguity associated with gated counters is eliminated in the harmonic number counter of the present invention because the gate time and counted frequency are integrally related.

Other and incidental objects of the present invention will be apparent from a reading of this specification and an inspection of the accompanying drawing which shows a block diagram of the frequency counting system of the present invention.

Referring now to the drawing there is shown a source of high frequency signal 9 which is adjustable over a wide range of frequencies using the coarse tuning control 11. This signal is applied to an input of each of harmonic phase detectors 13 and 15. These detectors may be of conventional design similar to instantaneous signal samplers as shown in the literature (see: gate 15 of U.S. Patent 3,011,129, issued on November 28, 1961 to K. B. Magleby et al. and "APC with Pulse Reference," T. J. Rey, Lincoln Laboratory Report 47G–0019, November 9, 1960, Chapters 5 and 7). The output frequency of the variable frequency oscillator 21 is divided down by divider 23 and is mixed in mixer 19 with the output from crystal standard 17 to produce a resultant signal which is applied to the other input of the phase detector 13. The output of the phase detector 13 is applied through switch 26 to a frequency-determining element of the signal source 9. In an alternate mode of operation this output signal is applied to a frequency-determining element in the variable frequency oscillator 21. Mixer 25 receives the output of crystal standard 17 and a frequency which is related by the division ratio K of divider 23 to the signal at the output of the variable frequency oscillator 21. The output of the mixer 25 is connected to the other input of phase detector 15. The output signal from the phase detector 15 is applied through gate 27 to a first counter 29 and is applied through gate 31 to a second counter 33. The gate 27 receives a gate signal from the divider and gate generator 35, the period of which is related to the frequency of the signal from variable frequency oscillator 21. The gate 31 receives a gate signal from divider and gate generator 37, the period of which is related to the frequency of the signal from crystal standard 17.

In operation, the phase detector 13 receives the signal from the output of signal source 9 and the resultant signal appearing at the output of mixer 19 and produces an error signal at its output 24 which is related to the phase difference between the output freqency $f_{out}$ and a harmonic, say the $M^{th}$ harmonic of the resultant signal from mixer 19. This error signal is applied to a frequency-determining element of the signal source 9 to maintain its output frequency at the proper value. Zero average frequency error is obtained with respect to the resultant or reference signal appearing at the output of mixer 19 when the output frequency is stabilized in this manner. Coarse tuning of the signal source 9 using the control 11 results in stepped variations in the output frequency over a wide tuning range, as shown in graph 18. This is the result of phase lock being established between the output frequency applied to one input of phase detector 13 and successive harmonics of the reference signal appearing at the output of mixer 19 as the tuning control 11 is varied. The frequency amplitude of the steps is the difference between successive harmonic frequencies of this reference signal. Fine frequency variations may be obtained by varying the frequency of the variable frequency oscillator 21 using the fine tuning control 22 as shown in graph 30. This causes a variation in the frequency of the reference signal appearing at the output of mixer 19. Adjustment of the fine tuning control 22 has the effect of shifting the entire plot of output frequency versus coarse tuning up or down on the frequency scale (broken-line curves on graph 18) by an amount at least greater than the height of a single step. The output frequency is thus continuously phase locked to the reference signal at the output of mixer 19 as the output frequency is varied over a wide range of frequencies using both the coarse tuning and fine tuning adjustments. This reference signal has frequency stability which approaches that of the crystal standard 17 where the variable frequency portion ($\delta$) of the reference frequency is very small compared with the frequency of crystal standard 17.

The present invention also provides highly accurate direct indications of the output frequency on the counters 29 and 33 using low frequency counting techniques. The conventional scheme of mixing a high frequency signal with a local oscillator signal to produce a beat frequency signal is inaccurate because of the lack of information regarding the harmonic of the local oscillator against which the high frequency signal is beating. This harmonic number information is retained in the present invention by combining in mixer 25 the frequency of the crystal standard 17 with the signal from frequency divider 28 which has a frequency related by a factor K to the freqency of the oscillator 21. The resultant signal is combined in phase detector 15 with the output frequency to produce a beat frequency which contains the harmonic number (M) information and the information regarding the frequency variations ($\delta$). The harmonic number may be obtained directly as the ratio of the frequency of the output from phase detector 15 and the frequency of the output of oscillator 21. In practice, this ratio is obtained digitally by counting in counter 29 the signal at the output of phase detector 15 for a gate period which is determined by the frequency of oscillator 21. This gate signal produced by divider and gate generator 35 includes a scale factor which enables the counter 29 to indicate directly the harmonic multiples (M) of the frequency $f_0$. Since frequency $f_0$ is a constant in the system, it may be included in the scale factor provided by gate generator 35. The signal at the output of phase detector 15 is also counted in counter 33 for a gate period which is determined by the frequency of the crystal standard 17. The divider and gate generator 37 includes a scale factor which permits the counter 33 to indicate the portion of the output frequency M $(f_0+\delta)$ which is provided by oscillator 21. Where the frequency variation covered by the oscillator 21 is decimally related to the frequency of crystal standard 17, say by a factor of one one hundredth, the two readings provided by counters 29 and 33, each with the proper scale factor, may be combined to provide a direct indication of the output frequency with six place accuracy. Also, where greater frequency stability in the output signal appearing at terminal 20 is required, the oscillator 21 may be stabilized by an error signal derived from error network 39. In one embodiment, this network produces an error signal $\epsilon$ from the comparison of a voltage related to the least significantly digits of counter 33 and a reference voltage from supply 41. In another embodiment, the output frequency from detector 15 is compared in an error network 39 with a reference frequency from supply 41.

The circuit of the present invention may also be used in an alternate mode to indicate the unknown frequency of an applied signal. In this mode, signal source 9 is removed, the unknown frequency is applied at the terminal 20, and switch 26 is set in the alternate position from that shown. Phase lock between the applied unknown signal and the output of the variable frequency oscillator 21 is established and the circuit provides a direct indication of the unknown frequency in a manner similar to that previously described for operation of the circuit with signal source 9 in place.

Therefore the circuit of the present invention provides an output signal having a frequency which is variable over a wide band of frequencies and which has the degree of frequency stability comparable to the reference frequency to which the high frequency signal is phase locked. Also, the present circuit provides a direct indication of the high frequency signal using low frequency counter techniques.

We claim:

1. Signal apparatus comprising:

an input circuit for receiving a signal frequency from a source;

a source of reference frequency;

means connected to the source for receiving said reference frequency and to the input circuit for receiving the signal frequency at said input circuit for producing a control signal representative of the phase relationship between the signal frequency at said input circuit and an integer multiple of the reference frequency;

means connected to one of said sources for applying said control signal thereto to maintain phase lock between the signal frequency at the input circuit and an integer multiple of the reference frequency;

circuit means having an input connected to the input circuit for receiving the signal frequency and having another input;

a source of first frequency equal to the reference frequency offset by a selected frequency value;

means connecting the source of first frequency and the other input of said circuit means for applying thereto a frequency proportional to the first frequency, said circuit means producing an output signal as a modulation product of the frequencies of signals applied to the inputs thereof;

a source of second signal proportional to said selected frequency value; and means connected to said circuit means and to said source of second signal for producing a first output as the combination of said output signal and second signal, the first output being representative of the number of the harmonic of the reference frequency to which the signal frequency at the input circuit is phase locked.

2. Signal apparatus as in claim 1 wherein:

the signal frequency is received at the input circuit from a source to be stabilized; and said control signal is applied to the source of signal frequency to be stabilized to alter the frequency thereof to maintain phase lock between said signal frequency and said reference frequency; and comprising:

a reference signal supply; and means connected to said supply to receive the reference signal therefrom and to said circuit means to receive the output signal therefrom for applying to said source of reference frequency an error signal produced as the combination of the reference signal and output signal to correct for variations in the reference frequency about a value proportional to the reference signal from said supply.

3. Signal apparatus as in claim 1 comprising:
a source of standard frequency;
a generator for producing a signal of selectable frequency;
a pair of frequency dividers connected to said generator, one of the frequency dividers dividing the signal of selectable frequency from the generator by a factor K and the other of the frequency dividers dividing the signal of selectable frequency from said generator by a factor $K \pm n$, where $n$ is an integer not less than 1;
a pair of mixers, each connected to receive the standard frequency from said source and the signal at the output of a freqency divider, one of the mixers producing said reference frequency at the output thereof and the other of said mixers producing the first frequency at the output thereof; and
said control signal is applied to said generator for altering the selectable frequency of the signal therefrom to maintain phase lock between the signal frequency at the input circuit and an integer multiple of the reference frequency.

4. Signal apparatus as in claim 1 comprising:
a source of standard frequency signal;
means connected to said circuit means and to said source of standard frequency signal for producing a second output as the combination of said output signal and standard frequency signal, the second output being representative of the frequency separation of the signal frequency at the input circuit from said standard frequency.

5. Signal apparatus as in claim 4 comprising:
a source of variable frequency;
means including a first mixer connected to the sources of standard and variable frequencies for producing said reference frequency as a modulation product of the frequencies applied to the first mixer; and
a second mixer having an input connected to said source of standard frequency and having another input;
means connected to said source of variable frequency and to the other input of said second mixer for applying thereto a frequency which is related to said variable frequency by a constant, non-unity proportionality factor, said second mixer producing said first frequency as a modulation product of the frequencies of signals applied to the inputs thereof;
said second output being representative of the frequency difference between the signal frequency at the input circuit and a selected harmonic of the standard frequency.

6. Signal apparatus as in claim 5 comprising:
a generator for producing a signal of selectable frequency;
a pair of frequency converters connected to said generator for producing at the outputs thereof said variable frequency and said frequency which is related to said variable frequency by a constant, non-unity proportionality factor;
one of said frequency converters converting the frequency of said signal of selectable frequency by a factor K; and
the other of said frequency converters converting the frequency of said signal of selectable frequency by a factor $K \pm n$ where $n$ is an integer not less than 1.

7. Signal apparatus as in claim 5 wherein:
said means for producing the first and second outputs each includes a digital logic circuit for producing a digital output proportional to the number of signals applied thereto; and comprising:
means connected to said circuit means and to the digital logic circuit providing the first output to apply thereto a frequency proportional to said output signal for a period proportional to said selected frequency value; and
means connected to said circuit means and to the digital logic circuit providing the second output to apply thereto a frequency proportional to said output signal for a period proportional to said standard frequency.

References Cited by the Examiner

UNITED STATES PATENTS

| | | | |
|---|---|---|---|
| 2,957,144 | 10/1960 | Huhn | 331—40 |
| 2,964,714 | 12/1960 | Jakubowics | 331—2 |
| 2,982,921 | 5/1961 | Rozner et al. | 331—17 |

ROY LAKE, *Primary Examiner.*

J. KOMINSKI, *Assistant Examiner.*